A. R. HAVENER.
CLUTCH MECHANISM.
APPLICATION FILED SEPT. 4, 1915.

1,165,407.

Patented Dec. 28, 1915.

Inventor:
Arthur R. Havener.
by Charles V. Goding
Atty.

UNITED STATES PATENT OFFICE.

ARTHUR R. HAVENER, OF WALTHAM, MASSACHUSETTS, ASSIGNOR TO AMERICAN LACING HOOK CO., A CORPORATION OF NEW JERSEY.

CLUTCH MECHANISM.

1,165,407.      Specification of Letters Patent.      Patented Dec. 28, 1915.

Original application filed May 29, 1914, Serial No. 841,932. Divided and this application filed September 4, 1915. Serial No. 49,036.

*To all whom it may concern:*

Be it known that I, ARTHUR R. HAVENER, a citizen of the United States, residing at Waltham, in the county of Middlesex and State of Massachusetts, have invented new and useful Improvements in Clutch Mechanisms, of which the following is a specification.

This invention relates to improvements in clutch mechanisms, the present embodiment of which is particularly adapted for use in connection with machines of the type embodied in my copending application Ser. No. 841,932, filed May 29, 1914. The subject matter of this application is divided out of said copending application of which it forms a part as originally filed.

The object of the invention is to provide a simple and effective clutch which may be operated, when the machine is being driven at a high rate of speed, to disconnect the driving member from the driven member thereof and to stop the movements of said driven member at a predetermined point without subjecting the mechanism to excessive shocks.

The invention consists in the combination and arrangement of parts set forth in the following specification and particularly pointed out in the claims thereof.

Figure 1:
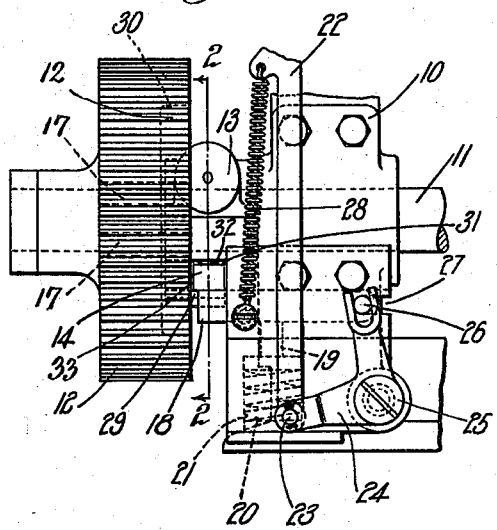
Figure 3:
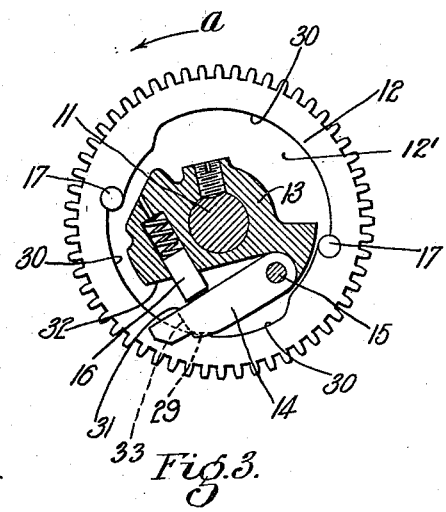
Figure 4:
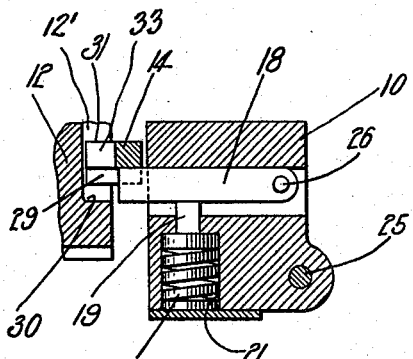
Figure 2:
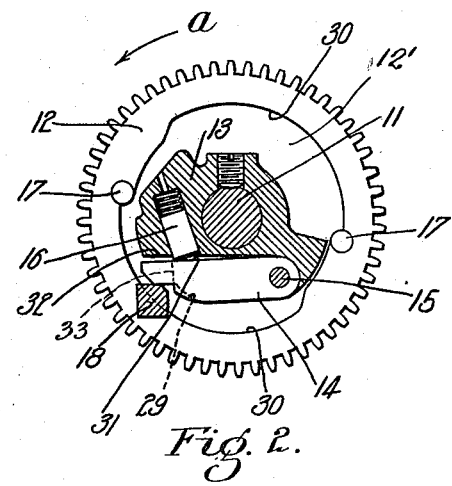

Referring to the drawings: Figure 1 is a side elevation of a clutch mechanism embodying my invention, portions of the frame and shaft being broken away to save space in the drawings. Fig. 2 is a section taken on the line 2—2 of Fig. 1 illustrating the parts of the clutch mechanism in the positions which they occupy when the clutch is thrown out of operation. Fig. 3 is a section similar to Fig. 2 illustrating the parts in the positions which they occupy when the clutch is thrown in. Fig. 4 is a detail sectional elevation illustrating a portion of the clutch shipping mechanism.

Like numerals refer to like parts throughout the several views of the drawings.

In the drawings, 10 is the frame of the machine and 11 the cam shaft which is to be operated by the clutch mechanism, said shaft being broken away to save space in the drawings. A gear 12 forming one part of the clutch is mounted to rotate freely upon the cam shaft 11, said gear being constructed and arranged to receive its power from any suitable source not shown in the drawings. Said gear 12 is locked to the shaft 11 by the other member 13 of said clutch, which is fastened to the shaft 11 and has a dog 14 pivoted at 15 to the member 13 of said clutch. The dog 14 is held in the position illustrated in Fig. 3 by a spring actuated pin 16 so that as the gear 12 is rotated in the direction of the arrow "$a$" a pin 17, fast to said gear 12, will engage the outer end 33 of the dog 14, where said dog projects laterally into the recessed portion 12' of said gear thus locking said gear 12 and the part 13 of said clutch together and rotating the shaft 11 in the direction of the arrow "$a$".

The gear 12 is unlocked from the part 13 of the clutch by a slide 18 which is caused to engage the outer end of the dog 14 and move the same out of engagement with the pin 17, from the position shown in Fig. 3 to that shown in Fig. 2 thus allowing the gear 12 to rotate freely, while the part 13 of the clutch and the shaft 11 to which it is fastened remain stationary. The slide 18 is supported on its under side by a buffer 19, said buffer being supported in turn by a spring 20 located in a recess 21 in the frame 10 of the machine.

The slide 18 is operatively connected with and operated by a treadle not shown in the drawings, said treadle being connected with said slide through a vertical rod 22 which at its lower end is connected by a pin 23 to a lever 24. The lever 24 is pivoted at 25 to the frame of the machine and is connected to a pin 26 which is fastened to the slide 18 and projects laterally therefrom through a slot 27. A spring 28 is connected at one end thereof to the frame of the machine and at the other end thereof to the rod 22.

When the machine is brought to a stop the blow of the dog 14 upon the slide 18 is transmitted to the buffer 19 and spring 20 and said slide is slightly depressed at the end adjacent to the dog 14 and rocks upon the pivotal pin 26. The spring 20 subsequently reacts and brings the slide 18 to bear against the frame along its upper edge, as illustrated in Fig. 4.

It will be seen that when the treadle is operated the rod 22 will be moved upwardly and the bell crank lever 24 will be tipped on its pivot 25 to move the slide 18 toward the right, Fig. 4, withdrawing the end of said slide from beneath the outer end of said dog and thus release the dog 14 of the clutch, which will be forced outwardly from the center by the spring pin 16 into the path of the pin 17 upon the rotating member or gear 12 of the clutch. The outward movement of said dog 14 is limited by the contacting of a shoulder 29 on said dog engaging an inner circumferential portion 30 formed within the gear 12. The two parts 12 and 13 of the clutch will then become locked together and the machine will be operated to rotate the cam shaft 11.

The operation just described takes place each time the treadle is operated to withdraw the slide 18 from engagement with the dog 14, but immediately upon the releasing of the treadle the spring 28, acting upon the rod 22 and through the bell crank lever 24, causes the slide 18 to be returned to the position indicated in Figs. 1 and 4 with the outer end of said slide protruding from the frame 10 into the path of the outer free end of the dog 14, whereupon said slide will be engaged by said dog, as illustrated in Fig. 2, swinging said dog inwardly against the pin 16 and withdrawing said dog from its engagement with the pin 17.

The impact between the dog 14 and slide 18 takes place when the machine is operating at full speed, causing said dog to be rocked inwardly about its pivot 15 until the upper edge 31 thereof engages the flattened face 32 on the member 13. The entire force of the impact must be sustained by the slide 18 and its supporting means, which supporting means include the buffer 19 and spring 20. This impact causes the slide 18 to be rocked about the axis of the pin 26 downwardly from the position illustrated in Fig. 4, depressing the buffer 19 and compressing the spring 20, which compression continues until the force of the impact has been overcome by said spring whereupon said buffer and slide 18 will be returned to their normal positions, as shown in Fig. 4.

It will be understood that when the gear 12 is driving the member 13 that one of the pins 17 will rest against the end portion 33 of the dog 14 and thus the part 13 will be rotated by the part 12, but when the portion of the dog 14 which extends outwardly beyond the end portion 33 as seen in Figs. 2 and 3 engages the slide 18 as illustrated in Fig. 2, said dog 14 will be swung upon its pivot 15 from the position illustrated in Fig. 3 to that illustrated in Fig. 2 and thus swinging on its pivot 15, the end 33 will become disengaged from the pin 17 and will allow the part 12 to rotate freely while the part 13 remains stationary.

Having thus described my invention what I claim and desire by Letters Patent to secure is:

1. A clutch mechanism having, in combination, a driving shaft, a clutch in two parts, one of said parts fast to said shaft, the other free to rotate thereon, a spring operated dog pivoted to said first named part and constructed and arranged to engage said second named part and lock said parts together, and a spring supported slide arranged to be engaged by said dog whereby said parts may be disengaged from each other.

2. A clutch mechanism having, in combination, a driving shaft, a clutch in two parts, one of said parts fast to said shaft, the other free to rotate thereon, a spring operated dog pivoted to said first named part and constructed and arranged to engage said second named part and lock said parts together, a spring supported slide, and means to move said slide longitudinally thereof out of and into the path of said dog whereby said parts may be alternately locked to and unlocked from each other.

3. A clutch mechanism having, in combination, a driving shaft, a clutch in two parts, one of said parts fast to said shaft, the other free to rotate thereon, a spring operated dog pivoted to said first named part and constructed and arranged to engage said second named part and lock said parts together, a slide arranged to be engaged by said dog whereby said parts may be disengaged from each other, and a spring supported buffer bearing against one side of said slide.

4. A clutch mechanism having, in combination, a driving shaft, a clutch in two parts, one of said parts fast to said shaft, the other free to rotate thereon, a spring operated dog pivoted to said first named part and constructed and arranged to engage said second named part and lock said parts together, a slide arranged to be engaged by said dog whereby said parts may be disengaged from each other, a spring supported buffer bearing against one side of said slide, a stationary support, and a pivotal pin fast to said slide and projecting laterally therefrom into a slot provided in said stationary support.

5. A clutch mechanism having, in combination, a driving shaft, a clutch in two parts, one of said parts fast to said shaft, the other free to rotate thereon, a spring operated dog pivoted to said first named part and constructed and arranged to engage said second named part and lock said parts together, a slide arranged to be engaged by said dog whereby said parts may be disengaged from each other, a spring supported buffer bearing against one side of said slide, a stationary support, a pivotal pin fast to said slide and projecting laterally therefrom into a slot provided in said stationary support, and means arranged to engage said pivotal pin and to move said slide longitudinally thereof out of and into the path of said dog.

In testimony whereof I have hereunto set my hand in presence of two subscribing witnesses.

ARTHUR R. HAVENER.

Witnesses:
CHARLES S. GOODING,
SYDNEY E. TAFT.